United States Patent
Sivanesan et al.

(10) Patent No.: US 7,787,532 B2
(45) Date of Patent: Aug. 31, 2010

(54) APPARATUS AND METHOD FOR MULTIUSER DETECTION IN CDMA COMMUNICATION SYSTEM

(75) Inventors: Kathiravetpillai Sivanesan, Suwon-si (KR); Marcos Daniel Katz, Suwon-si (KR); Chan-Byoung Chae, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1086 days.

(21) Appl. No.: 11/482,801

(22) Filed: Jul. 10, 2006

(65) Prior Publication Data

US 2007/0019712 A1 Jan. 25, 2007

(30) Foreign Application Priority Data

Jul. 8, 2005 (KR) ............... 10-2005-0061591

(51) Int. Cl.
*H03H 7/40* (2006.01)
*H03K 5/159* (2006.01)
(52) U.S. Cl. .............. 375/229; 375/232; 375/230
(58) Field of Classification Search .......... 375/229–236
See application file for complete search history.

(56) References Cited

U.S. PATENT DOCUMENTS

2006/0063505 A1* 3/2006 Cairns ................ 455/302

FOREIGN PATENT DOCUMENTS

KR 2004-105068 12/2004

OTHER PUBLICATIONS

Wen Ma, "Study and Implementation of Whitened Matched Filter in PBCC Receiver", *IEEE $6^{th}$ CAS Symp. on Emerging Technologies: Mobile and Wireless Comm.*, 2004, pp. 405-407.

* cited by examiner

*Primary Examiner*—David C Payne
*Assistant Examiner*—Linda Wong
(74) *Attorney, Agent, or Firm*—Roylance, Abrams, Berdo & Goodman, L.L.P.

(57) ABSTRACT

An apparatus and method for a multiuser receiver in a CDMA communication system are provided. The apparatus includes a plurality of White Matched Filters (WMFs) for pulse shaping received user signals, considering Multiple Access Interference (MAI), and a filter for detecting output signals of the WMFs using a Minimum Mean Square Error (MMSE) scheme, and outputting bit estimation values of the respective users. A transfer function of the WMF is determined by: adding a power spectral density function of the MAI to a power spectral density of an Additive White Gaussian Noise (AWGN); and multiplying an inverse number of the added value by a transfer function ($H^*(w)$) of a Conventional Matched Filter (CMF). Accordingly, the SNIR can be maximized and thus the BER performance may be improved, without additional information, by using the filter in which the power spectral density of the MAI is added to the AWGN and then multiplied by the CMF function.

12 Claims, 6 Drawing Sheets

FIG.1

(CONVENTIONAL ART)

APPARATUS AND METHOD FOR MULTIUSER DETECTION IN CDMA COMMUNICATION SYSTEM

PRIORITY

This application claims the benefit under 35 U.S.C. §119(a) of Korean Patent Application filed in the Korean Intellectual Property Office on Jul. 8, 2005 and assigned Serial No. 2005-61591, the entire disclosure of which is hereby incorporated by reference.

BACKGROUND OF THE INVENTION

1. Field of the Invention

The present invention relates generally to an apparatus and method for a multiuser receiver using a linear Minimum Mean Square Error (MMSE) scheme in a Code Division Multiple Access (CDMA) communication system. More particularly, the present invention relates to an apparatus and method for a multiuser receiver using an MMSE scheme, capable of improving a Bit Error Rate (BER) performance.

2. Description of the Related Art

A multiuser detection is a receiving scheme to detect a desired user signal, while mitigating the multiple access interference (MAI), noise and near far effect, in a wireless communication system where multiple users exist. Among the multiuser detection schemes for asynchronous Direct-Sequence Code Division Multiple Access (DS-CDMA), a Maximum Likelihood Sequence Detector (MLSD) achieves the best bit error rate (BER) performance. However, because the BER exponentially increases as the number of users increases, the MLSD is difficult to implement when there are many users. To solve this problem, suboptimum receivers have been proposed. One type of suboptimum receiver is a linear multiuser receiver using a Minimum Mean Square Error (hereinafter, referred to as MMSE) scheme. The multiuser receiver includes a conventional matched filter (CMF) and an MMSE filter. However, in the asynchronous DS-CDMA, the performance of the CMF is degraded when the number of users increases. Also, when the CMF is applied to the asynchronous DS-CDMA having the near far effect, its performance is degraded. For example, in the environment where the near far effect is serious or in the fading channel environment, the degradation of the performance becomes more serious when the magnitude of the received signal is small.

Hereinafter, a description will be made on an MMSE receiver using the CMF in an asynchronous DS-CDMA where the number of users is K and the bandwidth is restricted within a slow fading channel.

Equation (1) represents a signal r(t) received by a base station in a baseband for time $t(-\infty < t < \infty)$.

$$r(t) = \sum_{k=0}^{K} S_{k(t)} + n(t) \quad (1)$$

where $S_{k(t)}$ denotes a received signal of a $k^{th}$ user at time t, and n(t) denotes an Additive White Gaussian Noise (AWGN) at time t.

When the number of users is K, binary data signals of the respective users are multiplied by unique spreading signals and are then transmitted. The received signal $S_{k(t)}$ of the $k^{th}$ user is expressed as Equation (2):

$$S_{k(t)} = \sqrt{P_k}\, R_k e^{j\theta_k} \sum_{i=-\infty}^{\infty} b_i^{(k)} a_i^{(k)}(t - \tau_k - iT_b) \quad (2)$$

where k is the total number of users, $P_k$ is a signal power transmitted from the $k^{th}$ user, $R_k$ is a fading amplitude of the $k^{th}$ user, $b_i^{(k)}$ is a symbol transmitted from the $k^{th}$ user at an $i^{th}$ sampling interval, $T_b$ is a transmitted symbol period, $\theta_k$ is a phase angle of the $k^{th}$ user with respect to a $0^{th}$ user, $\tau_k$ is a timing offset of the $k^{th}$ user with respect to a $0^{th}$ user, $b_i^{(k)}$ is an $i^{th}$ bit of a $k^{th}$ user and satisfies the condition of $b_i^{(k)} \in [+1, -1]$, and $a_i^{(k)}(t)$ is a spreading signal for the bit $b_i^{(k)}$ of the $k^{th}$ user at time t.

The spreading signal $a_i^{(k)}(t)$ for the bit $b_i^{(k)}$ of the $k^{th}$ user is expressed as Equation (3):

$$a_i^{(k)}(t) = \sum_{n=1}^{N} c_{n+iN}^{k} q(t - nT_c) \quad (3)$$

where $c_n^{(k)}$ is an $n^{th}$ chip of a $k^{th}$ user PN sequence, $a_k$ is a $k^{th}$ user spreading sequence and $a_k = (c_1, \ldots, c_N)^T$.

If $a_k$ is a random spreading sequence, $c_n^{(k)}$ may have a value between [+1, −1]. N is a processing gain and is expressed as $T_b/T_c$. $R_k$ is a fading amplitude of the $k^{th}$ user and follows a Rayleigh distribution. $R_k$ is expressed as Equation (4)

$$f_{R_k}(r) = \frac{2}{\Omega} r \exp\left(-\frac{r^2}{\Omega}\right) \quad (4)$$

In Equation (4), $E|R_k^2|=\Omega$, and $\Omega$ is a second moment of the fading gain. The random variable sets $\{\tau_k\}$, $\{b_i^{(k)}\}$ and $\{R_k\}$ are mutually independent. Elements of the respective sets are independently and identically distributed.

In modem digital communication systems, digital data symbols are transmitted in a continuous pulse form with a characteristic suitable for channel transmission. When specific binary data is to be transmitted to a remote receiver, a data signal must be loaded on an appropriate carrier frequency and different pulses must be allocated to basic digital symbols "0" and "1".

In this procedure, a pulse shaping filter increases a bandwidth efficiency, minimizes an intersymbol interference, and maintains a signal to noise ratio (SNR).

In the receiver, a basic pulse q(t) must satisfy the condition of Equation (5):

$$\int_{-\infty}^{\infty} q^2(t)dt = T_c \quad (5)$$

In Equation (5), q(t) is a square wave comprising a value of "1" in the interval $[0, T_c]$ and "0" outside the interval $[0, T_c]$, and satisfies the condition of Equation (5).

Figure 1:
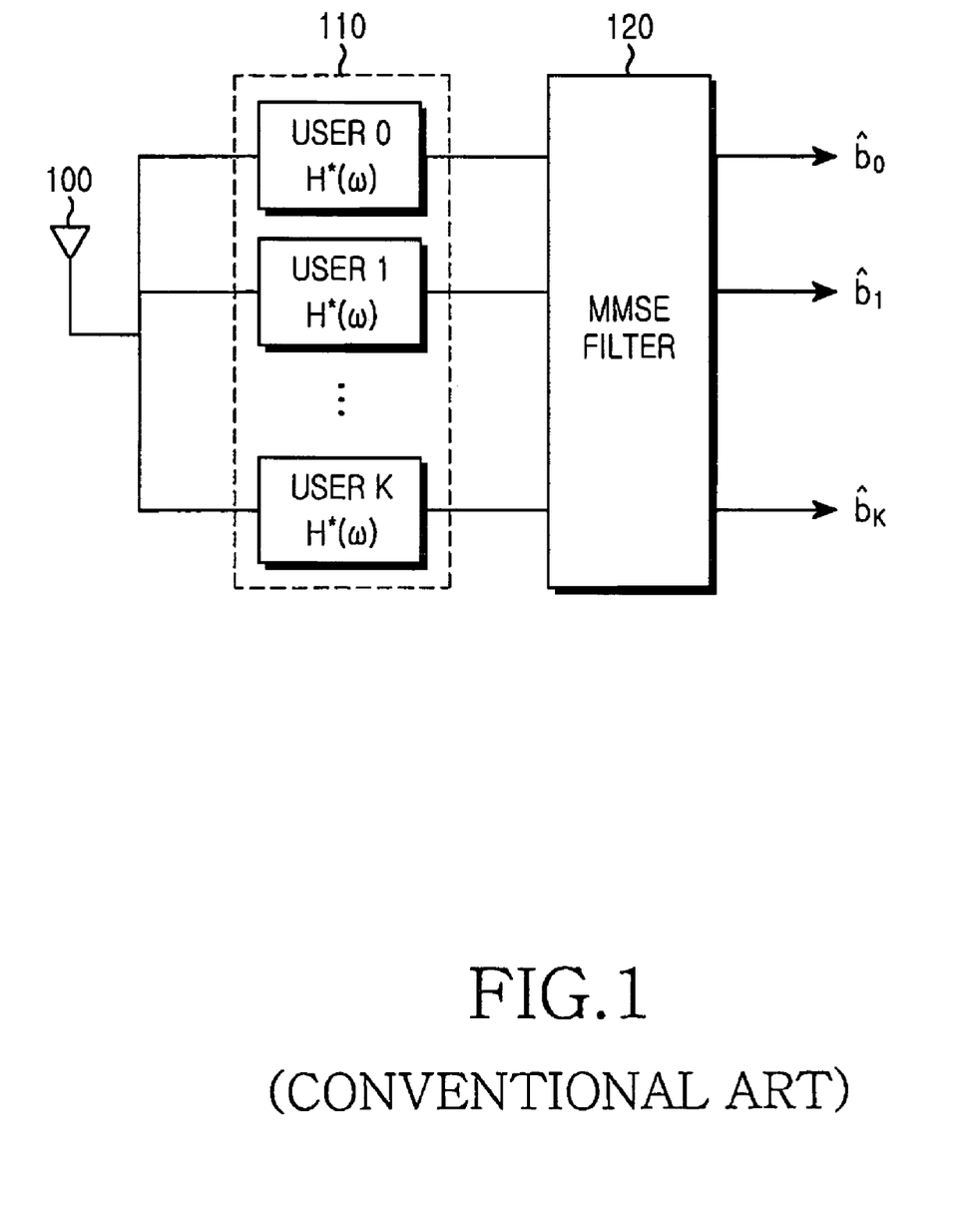
FIG. 1 is a block diagram of a conventional apparatus for multiuser detection in a CDMA communication system.

The pulse shaping filter reduces the noise effect at the receiver and the interference with other signals at the adjacent channels. A pulse shaping filter in FIG. 1 is a spectrum raised cosine pulse shape made considering a Nyquist pulse shaping. The raised cosine spectrum is expressed as Equation (6):

$$H_{RC}(f) = \begin{cases} T_c & 0 \leq |f| \leq \frac{1-\beta}{2T_c} \\ \frac{T_c}{2}\left\{1 + \cos\left\{\frac{\pi T_c}{\beta}\left\{|f| - \frac{1-\beta}{T_c}\right\}\right\}\right\} & \frac{1-\beta}{2T_c} \leq |f| \leq \frac{1+\beta}{2T_c} \\ 0 & |f| \geq \frac{1-\beta}{2T_c} \end{cases} \quad (6)$$

The raised cosine spectrum of Equation (6) is expressed as Equation (7) in time domain:

$$g(t) = \frac{\sin\left(\frac{\pi t}{T_c}\right)\cos\left(\frac{\pi \beta t}{T_c}\right)}{\frac{\pi t}{T_c}\left(1 - \frac{4\beta^2 t^2}{T_c^2}\right)} \quad (7)$$

where β is an excess bandwidth and is a value exceeding Nyquist minimum bandwidth.

FIG. 1 is a block diagram of a multiuser receiver using a CMF in a conventional asynchronous DS-CDMA communication system.

Referring to FIG. 1, the multiuser receiver includes an antenna 100, a matched filter unit 110 comprising (K+1) number of CMFs, and an MMSE filter 120.

The CMFs of the matched filter unit 110 are analogous to those described in Equations (6) and (7).

In the CMF, a $j^{th}$ sample $r_0[j]$ of a first user output passing through a pulse shaping is expressed as Equation (8):

$$r_0[j] = \int_{-\infty}^{\infty} r(jT_c - U)q(-u)du \quad (8)$$

If a timing offset of the first user is zero and a detection process is based on a single symbol interval $[0, T_b]$, Equation (8) may be rewritten as Equation (9):

$$r_0[j] = \sqrt{P_0}\,R_0 T_c b_0^{(0)} c_j^0 + \sum_{k=1}^{K} \sqrt{P_k}\,R_k T_c \sum_{-\infty}^{\infty}\sum_{n=1}^{N} b_i^{(k)} c_{n+iN}^K g(jT_c - \tau_k - iT_b - nT_c) + \eta[j] \quad (9)$$

A spreading sequence $a_k$ of the first user is modulated by a symbol $b_0^{(1)}$ transmitted for the interval $[0, T_b]$. Alternatively, the spreading sequence of the other users (k>1) is modulated by $b_{-1}^{(k)}$ for $0 \leq t \leq \tau_k$. Also, the spreading sequence is modulated by $b_0^{(k)}$ for $\tau_k \leq t \leq T_c$. The intersymbol interference from $b_{-2}^{(k)}$ or $b_1^{(k)}$ may exist depending on the value of $\tau_k$. When $t\in[0, t_b]$, vectors of the output signal samples passing through the CMFs are expressed as $r^T=\{r_0[1], \ldots, r_0[N]\}^T$. The vector r is expressed as Equation (10):

$$r_0[j] = \sqrt{P_0}\,R_0 T_c b_0^{(0)} a_0 + \sum_{k=1}^{K} \sqrt{P_k}\,R_k T_c \sum_{i=-2}^{1} b_i^{(k)} d_i + \eta \quad (10)$$

where η is an Additive White Gaussian Noise vector. A $j^{th}$ element of the vector $d_j$ is expressed as Equation (11):

$$d_i^j = \sum_{n=1}^{N} c_{n+iN}^k g(jT_c + \tau_k - iT_b - nT_c) \quad (11)$$

A signal to noise ratio (SNR) is expressed as Equation (12):

$$SNR = \frac{P_0 \Omega T_b}{N_0 T_b} = \frac{P_0 \Omega}{N_0} \quad (12)$$

In addition, Equation (10) is expressed as Equation (13):

$$r_0 = \sum_{j=1}^{L} b_j P_j + \eta_0 \quad (13)$$

where $b_j$ is a data symbol, L may have a value between K and 3K−2, and $P_j$ is a corresponding interference vector and is expressed as Equation (14):

$$P_1 = \sqrt{P_0}R_0 a_0 \quad (14)$$

The MMSE filter 120 may have N number of coefficients because the interval is $T_c$. The output of the MMSE filter 120 is expressed as Equation (15), which corresponds to bit estimation value:

$$\hat{b}_0 = sgn(C^T r_0) \quad (15)$$

The vector C is used for minimizing a Minimum Squared Error (MSE). The MSE is expressed as Equation (16):

$$MSE = E\left[(C^T r_0 - b_0)^2\right] \quad (16)$$
$$= (C^T p_1 - 1)^2 + \sum_{j=2}^{L}(C^T p_j)^2 + C^T TC$$

If Equation (16) is differentiated with respect to C and the differentiated equation is equated with zero, the result is expressed as Equation (17):

$$C = (A + p_1 p_1^T)^{-1} P_1 \quad (17)$$

In Equation (17), "A" is given by Equation (18):

$$A = \sum_{j=2}^{L} p_j p_j^T + T \quad (18)$$

The signals of the respective users are detected through the above-described procedures. These procedures will now be summarized with reference to FIG. 2.

Figure 2:
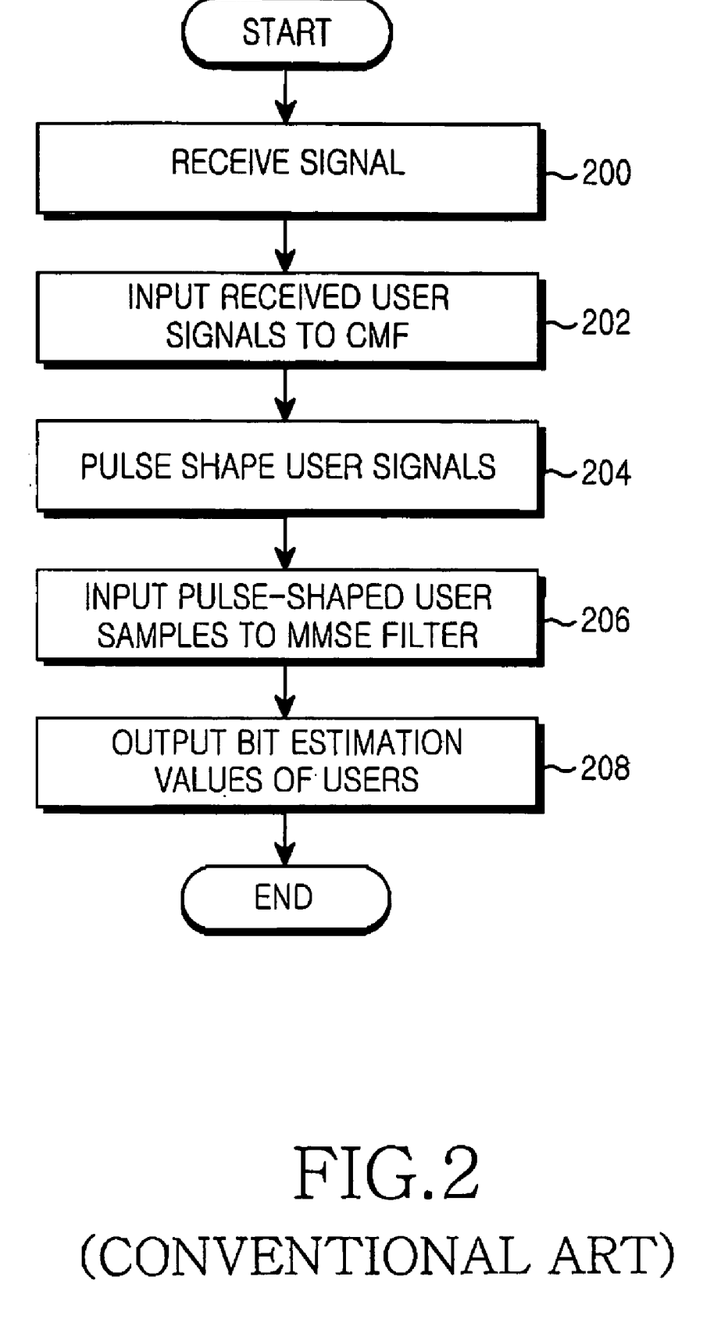
FIG. 2 is a flowchart illustrating a conventional method for multiuser detection using a linear MMSE scheme in a CDMA communication system.

Referring to FIG. 2, in steps 200 and 202, when a base station receives signals through an antenna, it inputs the received user signals to the CMF 110. In step 204, the CMF performs the pulse shaping on the user signals. In step 206, the base station inputs the pulse-shaped samples to the MMSE filter 120. In step 208, the base station calculates bit estimation values of the respective users by using the samples. Then, the base station terminates the algorithm.

As described above, in the asynchronous DS-CDMA, the performance of the CMF is degraded when the number of users increases. The performance of the CMF is also degraded when the CMF is applied to the asynchronous DS-CDMA with the near far effect. For example, in the environment where the near far effect is serious or in the fading channel environment, the degradation of the performance becomes more serious when magnitude of the received signal is small.

Accordingly, there is a need for an improved system and method for multiuser detection using a linear MMSE scheme in an asynchronous DS-DCMA communication system, capable of improving a BER performance.

SUMMARY OF THE INVENTION

An aspect of exemplary embodiments of the present invention is to address at least the above problems and/or disadvantages and to provide at least the advantages below. Accordingly, an aspect of exemplary embodiments of the present invention is to provide an apparatus and method for detecting multiuser using a linear MMSE scheme in an asynchronous DS-CDMA communication system, capable improving a BER performance.

Another object of an exemplary embodiment of the present invention is to provide an MMSE receiver and an MMSE receiving method using Whitening Matched Filters (WMFs).

According to one aspect of an exemplary embodiment of the present invention, a multiuser receiver for a CDMA communication system includes: a plurality of WMFs for pulse shaping received user signals, considering Multiple Access Interference (MAI); and a filter for detecting output signals of the WMFs using an MMSE scheme, and outputting bit estimation values of the respective users.

According to another aspect of an exemplary embodiment of the present invention, a multiuser receiving method for a CDMA communication system includes the steps of: performing a filtering operation using a WMF considering MAI of received user signals; and detecting the white matched filtered signals using an MMSE scheme and outputting bit estimation values of the respective users.

According to an additional aspect of an exemplary embodiment of the present invention, the WMF is determined by adding a power spectral density function of the MAI to a power spectral density of an Additive White Gaussian Noise (AWGN) and multiplying an inverse number of the added value by a transfer function (H*(w)) of a Conventional Matched Filter (CMF).

Other objects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other exemplary objects, features and advantages of certain exemplary embodiments of the present invention will become more apparent from the following detailed description when taken in conjunction with the accompanying drawings in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Hereinafter, a multiuser receiver using an MMSE scheme with an improved BER in a CDMA communication system according to an exemplary embodiment of the present invention will be described in detail. According to an exemplary embodiment of the present invention, a signal to noise interference ratio (SNIR) may be maximized using a Whitening Matched Filter (WMF), instead of the CMF, thereby improving the BER performance.

Figure 3:
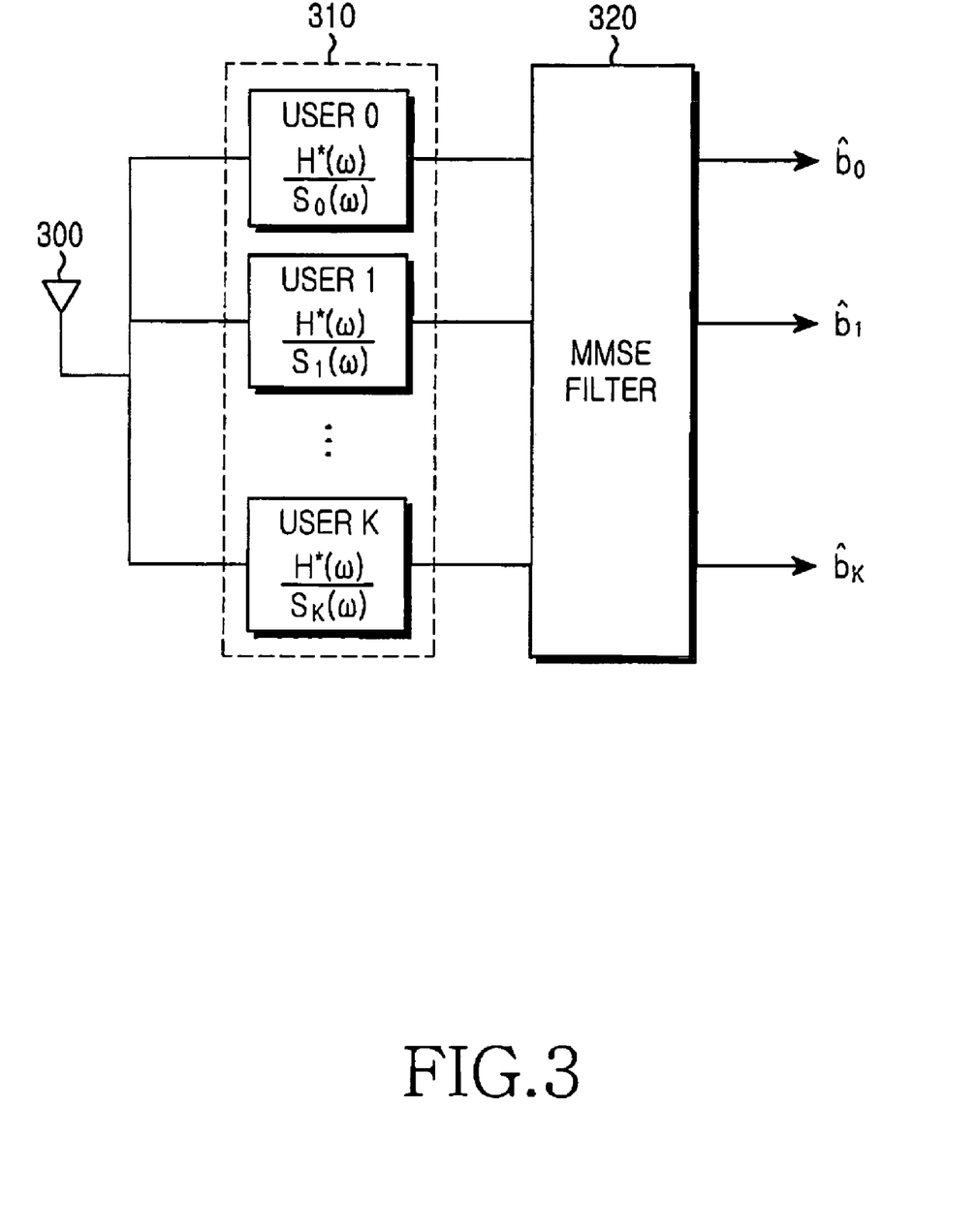
FIG. 3 is a block diagram of an apparatus for multiuser detection in a CDMA communication system according to an exemplary embodiment of the present invention.

FIG. 3 is a block diagram of a multiuser receiver for a CDMA communication system according to an exemplary embodiment of the present invention. Referring to FIG. 3, the multiuser receiver includes an antenna 300, a WMF unit 310 comprising (K+1) number of WMFs, and an MMSE filter 320.

The WMF of an exemplary embodiment of the present invention is obtained by multiplying a filter expressed as Equation (19) by a CMF function H*(ω). The SNIR may be maximized by using the WMF.

$$G(\omega) = \frac{1}{S_n(\omega)} \tag{19}$$

where $S_n(\omega)$ is obtained by adding a Multiple Access Interference (MAI) to a Power Spectral Density (PSD) of background noise and is expressed as Equation (20):

$$S_n(\omega) = N_0 + P_k K |H(\omega)|^2 \tag{20}$$

where $N_0$ is the power spectral density of the Additive White Gaussian Noise. Accordingly, the pulse shaping filter used in the WMC 310 is expressed as Equation (21):

$$X(f) = \frac{|H(f)|^2}{N_0 + P_k K |H(f)|^2} \tag{21}$$

where X(f) is the pulse shaping filter used in the WMC 210. A vector of the first user passing through the pulse shaping is expressed as Equation (22):

$$r_0 = \sqrt{P_0} R_0 T_c b_0^{(0)} d + \sum_{k=1}^{K} \sqrt{P_k} R_k T_c \sum_{i=-2}^{1} b_i^{(k)} d_i^w + \eta_w \quad (22)$$

The $j^{th}$ element of the vector d is expressed as Equation (23):

$$d^j = \sum_{n=1}^{N} c_n^k g_w((j-n)T_c) \quad (23)$$

The $j^{th}$ element of the vector $d_j^w$ is expressed as Equation (24):

$$d_i^w = \sum_{n=1}^{N} c_{n+iN}^k g_w(jT_c - \tau_k - iT_b - nT_c) \quad (24)$$

where $g_w(\cdot)$ is an inverse Fourier transform of X(f) and $\eta_w$ is the background noise vector. Equation (22) may also be expressed as Equation (25):

$$r_0 = \sum_{j=1}^{L} b_j P_j^w + \eta_w \quad (25)$$

where $b_j$ is data symbol, $P_j^w$ is the interference vector of Equation (25), and L may have a value between K and 3K−2, depending on the value of $\tau_k$. Also, $P_j^w$ is expressed as Equation (26):

$$P_1^w = \sqrt{P_0} R_0 d \quad (26)$$

The MMSE filter 320 may have N number of coefficients because the interval is $T_c$. The output of the MMSE filter 320 is expressed as Equation (27):

$$\hat{b}_0 = sgn(C^T r_0) \quad (27)$$

Figure 4:
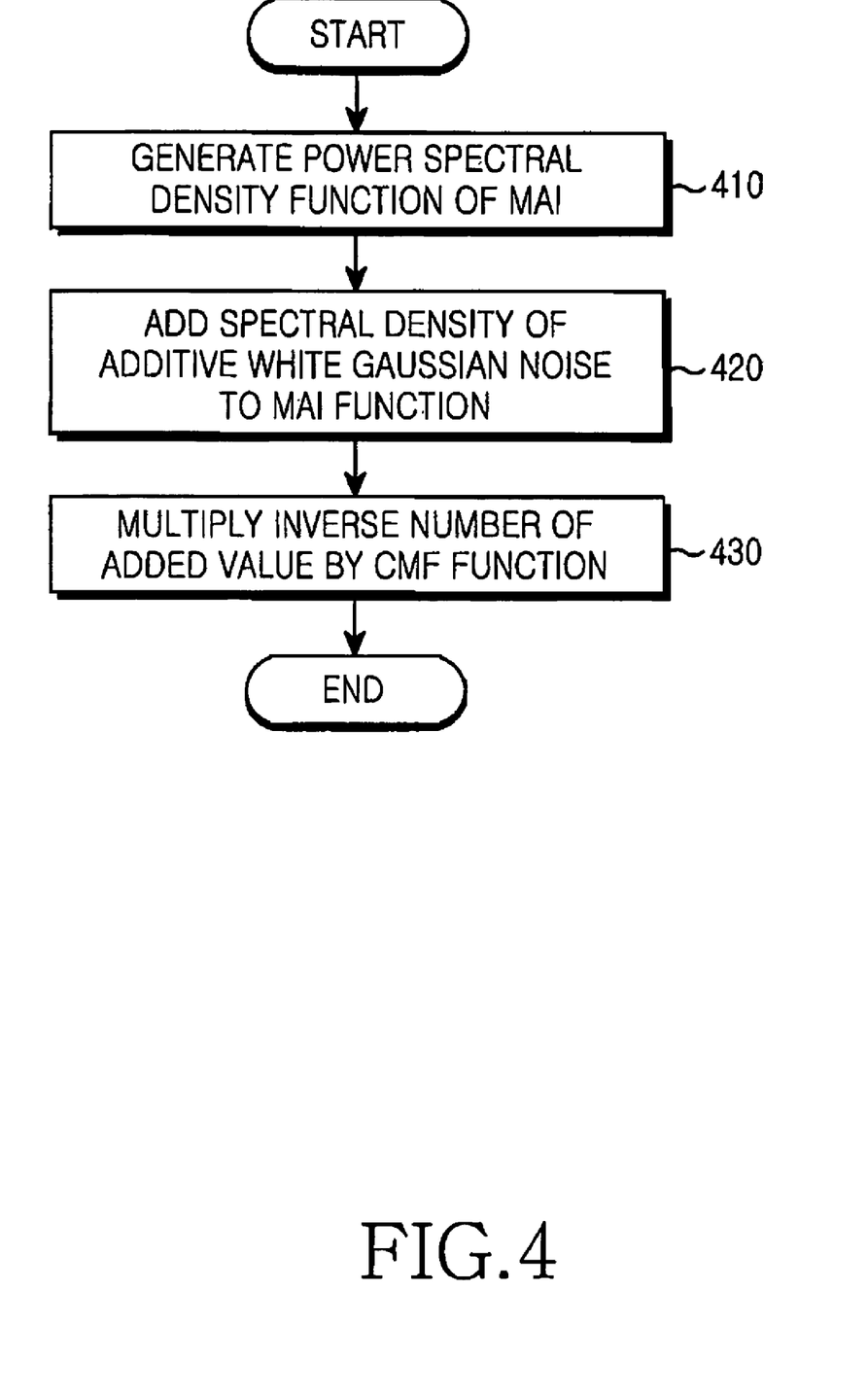
FIG. 4 is a flowchart illustrating a method for multiuser detection in a linear MMSE scheme in a CDMA communication system according to an exemplary embodiment of the present invention.

FIG. 4 is a flowchart illustrating a method for configuring the WMF 310 for pulse shaping the received signals of the respective users when the MMSE receiver is used in the DS-CDMA communication system according to an exemplary embodiment of the present invention.

Referring to FIG. 4, in step 410, the base station calculates the power spectral density function $P_k|H(\omega)|^2$ of the MAI. In step 420, the base station adds the spectral density of the Additive White Gaussian Noise to the MAI function. In step 430, the base station configures the WMF by multiplying the inverse number of the added value by the CMF function.

As described above, the power spectral density function of the MAI of the received signal is added to the power spectral density of the Additive White Gaussian Noise and then multiplied by the CMF. The WMF considers both the SNR and the MAI. That is, the WMF considers the SNIR. Therefore, the linear MMSE multiuse receiver may have a near far resistance and an improved BER performance.

Figure 5:
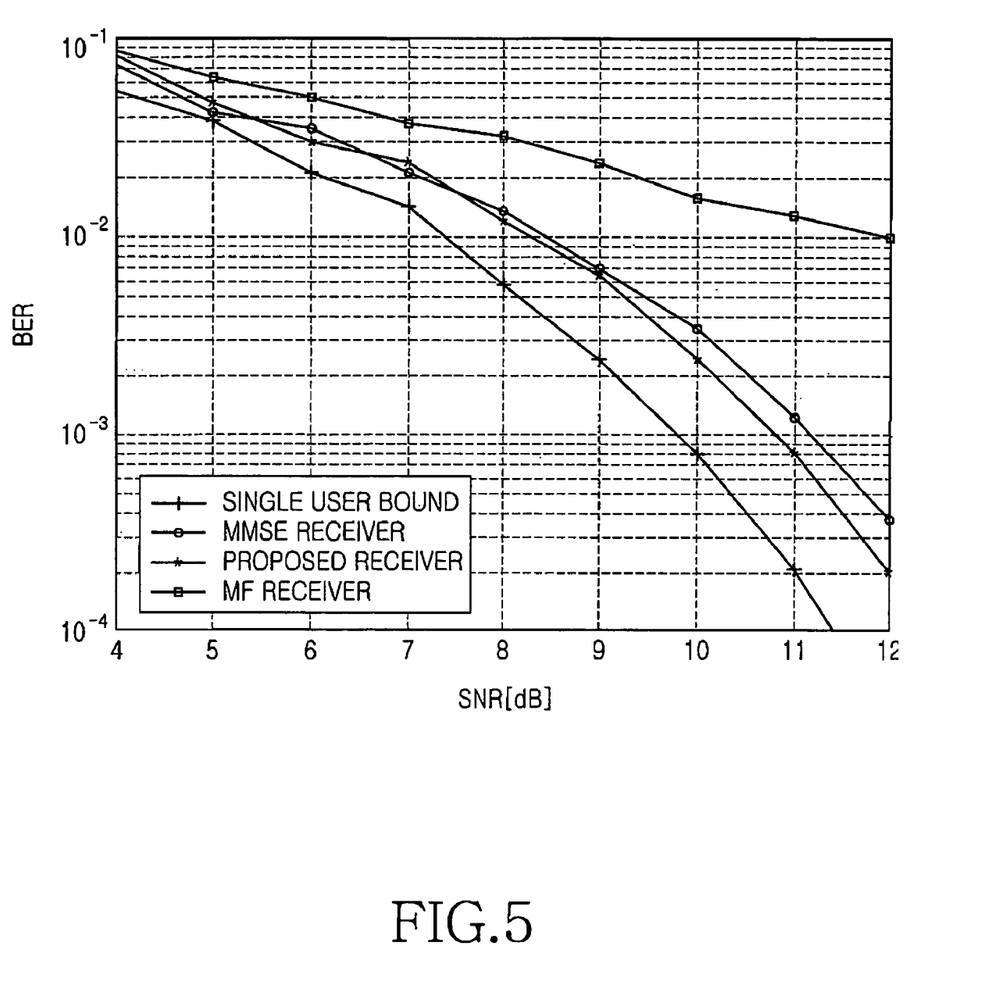
FIGS. 5 and 6 are graphs illustrating comparison of performance of exemplary embodiments of the present invention and the conventional systems.
Figure 6:
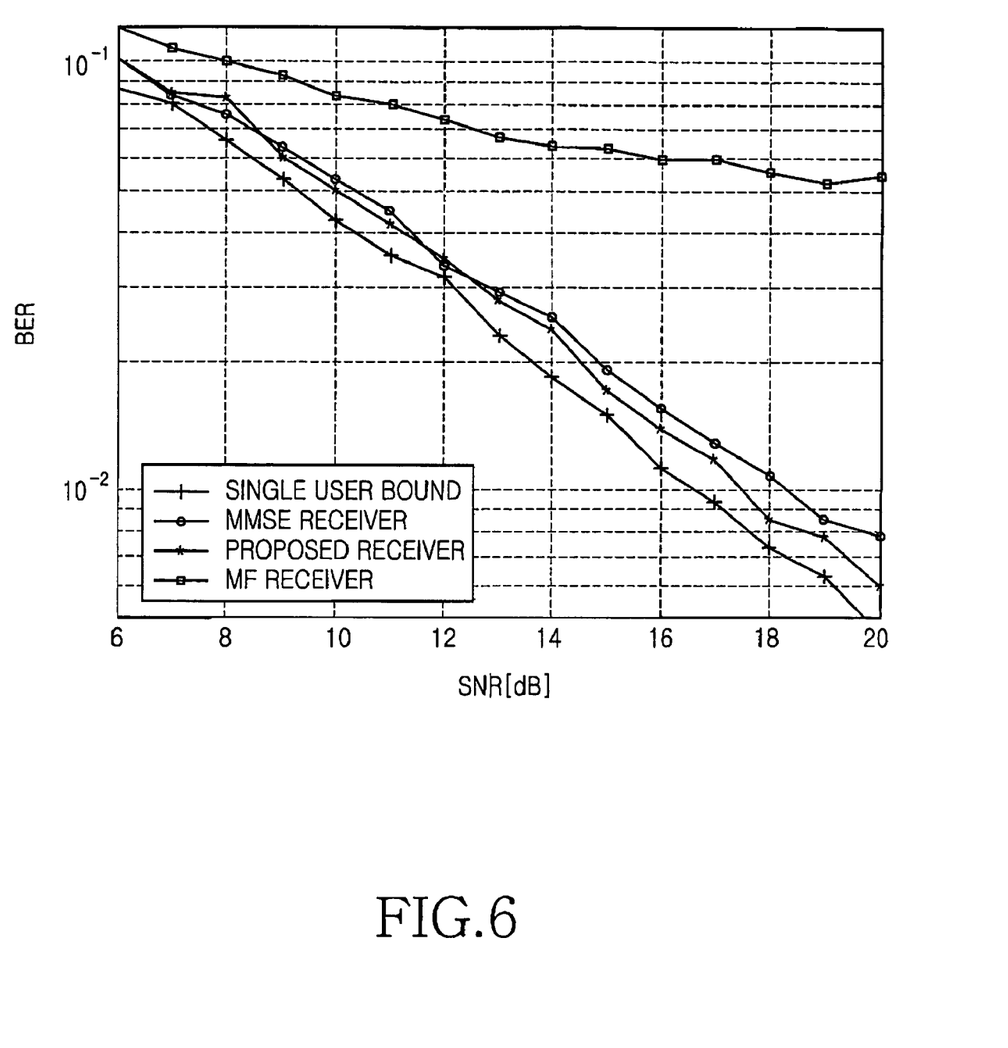

FIGS. 5A and 5B are graphs illustrating a comparison of performances in the exemplary embodiment of the present invention and the related art.

FIG. 5A is a graph illustrating the relationship of the BER performance and the SNR in the AWGN channel. Compared with the related art, an exemplary embodiment of the present invention exhibits the improved performance of 0.5-0.75 dB in the SNR axis.

FIG. 5B is a graph illustrating the relationship of the BER performance and the SNR in the slow flat Rayleigh fading channel. FIG. 5B exhibits the improved BER performance similar to that in FIG. 5A.

As described above, the linear MMSE multiuser receiver may improve the BER performance by maximizing the SNIR in the asynchronous DS-CDMA system. For example, the SNIR may be maximized and thus the BER performance may be improved. This may be achieved without additional information by using the filter in which the power spectral density of the MAI is added to the AWGN and then multiplied by the CMF function.

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A multiuser receiver for a Code Division Multiple Access (CDMA) communication system, comprising:
   a plurality of White Matched Filters (WMFs) for pulse shaping received user signals, considering Multiple Access Interference (MAI); and
   a filter for detecting output signals of the WMFs using a Minimum Mean Square Error (MMSE) scheme, and outputting bit estimation values of the respective users, wherein a transfer function of each WMF is determined by:
   adding a power spectral density function of the MAI to a power spectral density of an Additive White Gaussian Noise (AWGN); and
   multiplying an inverse number of the added value by a transfer function (H*(w)) of a Conventional Matched Filter (CMF), wherein the WMF performs the pulse shaping filtering operation using:

$$X(f) = \frac{|H(f)|^2}{N_0 + P_k K |H(f)|^2}$$

where $N_o$ is a power spectral density of an Additive White Gaussian Noise (AWGN), $P_k K|H(f)|^2$ is a power spectral density of the MAI, and H(f) is a Fourier transform of a transmission pulse.

2. The multiuser receiver of claim 1, wherein the CMF is expressed as:

$$H_{RC}(f) = \begin{cases} T_c & 0 \le |f| \le \frac{1-\beta}{2T_c} \\ \frac{T_c}{2}\left\{1 + \cos\left\{\frac{\pi T_c}{\beta}\left\{|f| - \frac{1-\beta}{T_c}\right\}\right\}\right\} & \frac{1-\beta}{2T_c} \le |f| \le \frac{1+\beta}{2T_c} \\ 0 & |f| \ge \frac{1-\beta}{2T_c} \end{cases}$$

where $T_c$ is a chip duration and $\beta$ is an excess bandwidth.

3. The multiuser receiver of claim 1, further comprising: an antenna for supplying signals to a base station wherein the base station inputs pulse shaped samples to the MMSE filter.

4. The multiuser receiver of claim 3, wherein the base station calculates bit estimation values of users by using the samples.

5. A multiuser receiving method for a Code Division Multiple Access (CDMA) communication system, comprising the steps of:
performing a filtering operation using a White Matched Filter (WMF) considering Multiple Access Interference (MAI) of received user signals; and
detecting white matched filtered signals using a Minimum Mean Square Error (MMSE) scheme and outputting bit estimation values of the respective users, wherein the WMF is determined by:
adding a power spectral density function of the MAI to a power spectral density of an Additive White Gaussian Noise (AWGN); and
multiplying an inverse number of the added value by a transfer function (H*(w)) of a Conventional Matched Filter (CMF), wherein the WMF performs the pulse shaping filtering operation using:

$$X(f) = \frac{|H(f)|^2}{N_0 + P_k K |H(f)|^2}$$

where $N_0$ is a power spectral density of an Additive White Gaussian Noise (AWGN), $P_k K |H(f)|^2$ is a power spectral density of the MAI, and H(f) is a Fourier transform of a transmission pulse.

6. The multiuser receiving method of claim 5, wherein the CMF is expressed as:

$$H_{RC}(f) = \begin{cases} T_c & 0 \le |f| \le \frac{1-\beta}{2T_c} \\ \frac{T_c}{2}\left\{1 + \cos\left\{\frac{\pi T_c}{\beta}\left\{|f| - \frac{1-\beta}{T_c}\right\}\right\}\right\} & \frac{1-\beta}{2T_c} \le |f| \le \frac{1+\beta}{2T_c} \\ 0 & |f| \ge \frac{1-\beta}{2T_c} \end{cases}$$

where $T_c$ is a chip duration and $\beta$ is an excess bandwidth.

7. The multiuser receiving method of claim 3, wherein the filtering operation is performed on signals supplied to a base station.

8. The multiuser receiving method of claim 7, wherein pulse shaped samples resulting from the filtering operation are input to the MMSE filter.

9. The multiuser receiving method of claim 8, wherein the bit estimation values of users are calculated by using the samples.

10. A multiuser receiver for a wireless communication system, comprising:
a filter block including a plurality of filters for pulse shaping received user signals, considering Additive White Gaussian Noise (AWGN) and Multiple Access Interference (MAI); and
a Minimum Mean Square Error (MMSE) filter for detecting output signals of the filter block using a Minimum Mean Square Error (MMSE) scheme, wherein a transfer function of the filters in the filter block is determined by:
adding a power spectral density function of the MAI to a power spectral density of the AWGN; and
multiplying an inverse number of the added value by a transfer function of a Conventional Matched Filter (CMF), wherein, the CMF is expressed as:

$$H_{RC}(f) = \begin{cases} T_c & 0 \le |f| \le \frac{1-\beta}{2T_c} \\ \frac{T_c}{2}\left\{1 + \cos\left\{\frac{\pi T_c}{\beta}\left\{|f| - \frac{1-\beta}{T_c}\right\}\right\}\right\} & \frac{1-\beta}{2T_c} \le |f| \le \frac{1+\beta}{2T_c} \\ 0 & |f| \ge \frac{1-\beta}{2T_c} \end{cases}$$

where $T_c$ is a chip duration of $\beta$ is an excess bandwidth, and wherein the filter performs the pulse shaping filtering operation using:

$$X(f) = \frac{|H(f)|^2}{N_0 + P_k K |H(f)|^2}$$

where $N_0$ is a power spectral density of an Additive White Gaussian Noise (AWGN), $P_k K |H(f)|^2$ is a power spectral density of the MAI, and H(f) is a Fourier transform of a transmission pulse.

11. The multiuser receiver of claim 10, further comprising:
an antenna for supplying signals to a base station wherein the base station inputs pulse shaped samples to the MMSE filter.

12. The multiuser receiver of claim 11, wherein the base station calculates bit estimation values of users by using the samples.

* * * * *